(12) United States Patent
Kang et al.

(10) Patent No.: US 12,076,868 B2
(45) Date of Patent: *Sep. 3, 2024

(54) CLOUD BASED COMPUTER-IMPLEMENTED VISUALLY PROGRAMMING METHOD AND SYSTEM FOR ROBOTIC MOTIONS IN CONSTRUCTION

(71) Applicant: SMART BUILDING TECH CO., LTD., Taipei (TW)

(72) Inventors: Shih-Chung Kang, Taipei (TW);
Liang-Ting Tsai, Taipei (TW);
Cheng-Hsuan Yang, Taipei (TW)

(73) Assignee: ROBIM TECHNOLOGIES INC. OF CANADA, Edmonton (CA)

( * ) Notice: Subject to any disclaimer, the term of this patent is extended or adjusted under 35 U.S.C. 154(b) by 318 days.

This patent is subject to a terminal disclaimer.

(21) Appl. No.: 17/218,653

(22) Filed: Mar. 31, 2021

(65) Prior Publication Data

US 2021/0316458 A1    Oct. 14, 2021

Related U.S. Application Data

(60) Provisional application No. 63/007,060, filed on Apr. 8, 2020.

(51) Int. Cl.
| | |
|---|---|
| *B25J 9/16* | (2006.01) |
| *G06F 3/0486* | (2013.01) |
| *G06F 8/34* | (2018.01) |
| *G06F 16/957* | (2019.01) |

(52) U.S. Cl.
CPC ........... *B25J 9/1671* (2013.01); *B25J 9/1664* (2013.01); *B25J 9/1689* (2013.01); *G06F 3/0486* (2013.01); *G06F 8/34* (2013.01); *G06F 16/9577* (2019.01)

(58) Field of Classification Search
CPC ...... B25J 9/1671; B25J 9/1664; B25J 9/1689; G06F 3/0486; G06F 8/34; G06F 16/9577
See application file for complete search history.

(56) References Cited

U.S. PATENT DOCUMENTS

| | | | | |
|---|---|---|---|---|
| 9,182,762 B2 * | 11/2015 | Yabushita | ............ | G05D 1/0246 |
| 11,023,511 B1 * | 6/2021 | Fletcher | ................ | G06F 16/338 |
| 2012/0072023 A1 * | 3/2012 | Ota | ........................ | B25J 9/1664 |
| | | | | 901/1 |

(Continued)

*Primary Examiner* — Sohana Tanju Khayer
(74) *Attorney, Agent, or Firm* — Demian K. Jackson; Jackson IPG PLLC

(57) ABSTRACT

The present invention relates to a computer-implemented method. The method includes causing a visual programming panel including a timeline editor and a plurality of motion blocks enabling a variety of robotic motions to be displayed in a visualization interface provided by a robot simulator shown on a web browser; selecting from a user, at the visual programming panel, at least one motion block from the plurality of motion blocks and adding the at least one motion block into the timeline editor, via a drag-and-drop, to form a motion configuration; and according to the motion configuration at the visual programming panel, automatically generating a program capable of commanding an end effector equipped on a target robot in a work cell to perform at least one selected robotic motion from the variety of robotic motions in the robot simulator.

7 Claims, 5 Drawing Sheets

(56) References Cited

U.S. PATENT DOCUMENTS

| | | | |
|---|---|---|---|
| 2015/0239121 A1* | 8/2015 | Takeda | G06N 7/00 |
| | | | 700/250 |
| 2017/0129100 A1* | 5/2017 | Takeda | G06N 7/01 |
| 2017/0206064 A1* | 7/2017 | Breazeal | B25J 11/0005 |
| 2019/0191137 A1* | 6/2019 | Bisti | H04N 23/73 |
| 2019/0302792 A1* | 10/2019 | Asahara | G05D 1/0217 |
| 2019/0384404 A1* | 12/2019 | Raghoebardajal | G06F 3/16 |
| 2020/0101599 A1* | 4/2020 | Yoshida | B25J 9/1671 |
| 2021/0078167 A1* | 3/2021 | Khansari Zadeh | G06T 7/90 |
| 2021/0154842 A1* | 5/2021 | Lin | B25J 9/161 |
| 2021/0375044 A1* | 12/2021 | George | G06T 15/04 |
| 2022/0226995 A1* | 7/2022 | Beck | B25J 11/0055 |
| 2022/0253186 A1* | 8/2022 | Bogdanowicz | G05B 19/409 |
| 2023/0030278 A1* | 2/2023 | Sakuma | B25J 9/1664 |

\* cited by examiner

CLOUD BASED COMPUTER-IMPLEMENTED VISUALLY PROGRAMMING METHOD AND SYSTEM FOR ROBOTIC MOTIONS IN CONSTRUCTION

CROSS-REFERENCE TO RELATED APPLICATION

This application is based upon and claims the benefit of priority to U.S. Provisional Application No. 63/007,060, filed on Apr. 8, 2020, the entire disclosure of which is incorporated herein by reference.

COPYRIGHT NOTICE

A portion of the disclosure including at least descriptions, embodiments, claims, and drawings of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD

The present invention relates to a cloud based computer-implemented method and system for visually programming robotic motions in robotic construction, in particular to a cloud based computer-implemented method and system providing a visual programming panel based on a block-based programming, an icon-based coding or a graphical programming for visually programming robotic motions in robotic construction.

BACKGROUND

Robotic automation process in building construction is an emerging technology and involves the use of one or more robotic devices that are applied to construct the building or essential components composing the building, such as a floor panel, a wall panel, a door panel, a window panel, or any other components, in a fully automatic or semi-automatic way.

The robotic devices are usually equipped with end effector to mount and connect tools, such as a gripper or a drill, that is used during the constructing process. The robotic devices are pre-programmed with sequences of specific motion commands and commands for other operations in order to cause the robotic devices to complete the constructing process.

The robotic automation construction is suitable for constructing unique and special structures with features of high complexity, high-mix, and low-volume, and is proved with high degrees of versatility, diversity and flexibility to perform construction works. Through the decades of development, currently there are two major robotic automation construction methods available, the on-site robotic construction scheme and the off-site robotic construction scheme.

However, the preparation of numerous parameters, actions, motions and paths of the robotic devices to carry out the constructing process is highly complicated and sophisticated, required to be scheduled, planned, validated, and rehearsed repetitively for many times, prior to the commencement of the constructing process, and impossible to be done by using actual robotic devices.

Hence, there have been proposed quite a few conventional various robot simulators, to duly assist users in performing the preparation. Nevertheless, the issue is, those robot simulators are yet too complicated to learn and use, although they usually provide various graphical user interfaces for users to operate. In order to well manage those simulators, the users are required to be proficient in at least two or more programming languages.

Hence, there is a need to further develop and design a series of assisted visual programming toolbars or panels with for example customizable configurations and are capable of visualizing the arrangement and scheduling processes for a single robot or multiple robotic devices, to solve the above deficiencies/issues.

SUMMARY

In view of the state of the art, the present invention provides a cloud based computer-implemented method and system for visually programming robotic motions in robotic construction. In particular, a cloud based computer-implemented method and system providing a visual programming panel based on a block-based programming, an icon-based coding or a graphical programming for visually programming robotic motions in robotic construction.

Accordingly, the present invention provides a computer-implemented method. The method includes causing a visual programming panel including a timeline editor and a plurality of motion blocks enabling a variety of robotic motions to be displayed in a visualization interface provided by a robot simulator shown on a web browser; selecting from a user, at the visual programming panel, at least one motion block from the plurality of motion blocks and adding the at least one motion block into the timeline editor, via a drag-and-drop, to form a motion configuration; and according to the motion configuration at the visual programming panel, automatically generating a program capable of commanding an end effector equipped on a target robot in a work cell to perform at least one selected robotic motion from the variety of robotic motions in the robot simulator.

The present invention further provides a computer-implemented system. The system includes a user device installed with a web browser to enable web browsing to access an internet for a user to operate; and a cloud computing server system available on the internet and configured to: cause a visual programming panel including a timeline editor and a plurality of motion blocks enabling a variety of robotic motions to be displayed in a visualization interface provided by a robot simulator shown on the web browser; receive by the user device from the user, at the visual programming panel, a selection of at least one motion block from the plurality of motion blocks and add the selected at least one motion block into the timeline editor, via a drag-and-drop, to form a motion configuration; and according to the motion configuration at the visual programming panel, automatically generate a program capable of commanding an end effector equipped on a target robot in a work cell to perform at least one selected robotic motion from the variety of robotic motions in the robot simulator shown on the web browser.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1:
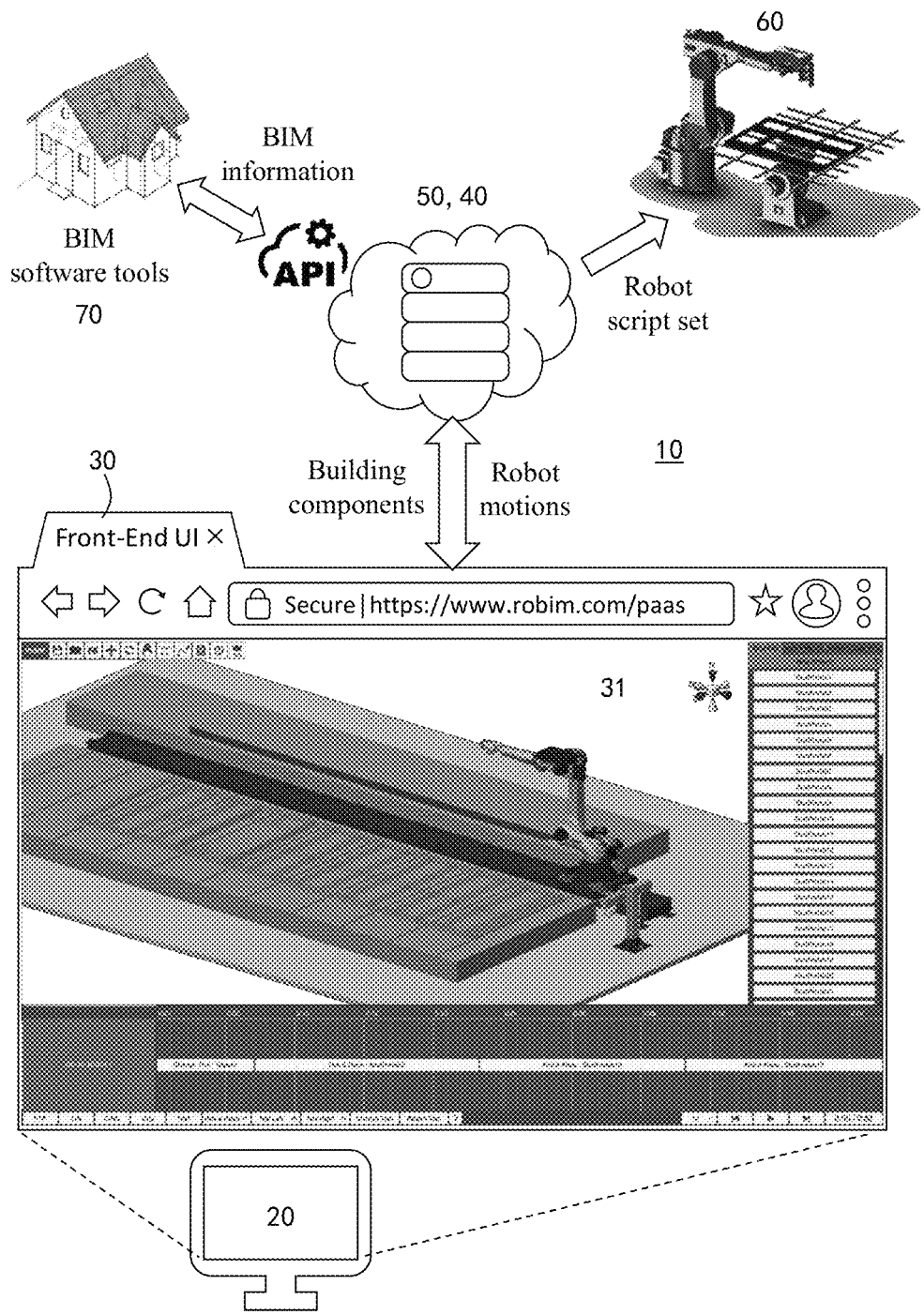
FIG. 1 is a schematic diagram illustrating a system view for a cloud based computer-implemented system according to a first example embodiment of the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

In this disclosure, the terms "robot", "robots", and the like refer to any automatically operated mechanical machine which is programmed to perform a wide variety of functions, operations, duties or tasks automatically, may not resemble human beings in appearance or perform in a humanlike manner, and have different scalable formation varied from a lightweight manufacturing robots to a heavy-load or heavy-duty assembly robots. In certain embodiments of the disclosure, the robot is preferably an industrial robot or a multi-axis robot arm, and may be regarded as a robot builder.

The term "building" means any form of building, such as a house, a wooden house, a reinforced concrete building, a steel building, a steel-reinforced concrete building, a residential complex, an apartment complex, a condominium, a dwelling unit, or a skyscraper, which is built by implementing civil engineering means or civil engineering based construction works.

The terms "work cell" and "scene" refer to a cluster of robots, equipment, and materials that are required for the robot to carry out the fabrication task, in particular a construction component prefabrication task. The configuration of the work cell is highly in association with the productivity and costs. The user is able to try different combinations of work parameters, and change different robot to test and find out and a better configuration. In this disclosure, the work cell is equivalent to and also known as the scene.

FIG. 1 is a schematic diagram illustrating a system view for a cloud based computer-implemented system according to a first example embodiment of the present invention. FIG. 1 demonstrates an example computer-implemented system 10 that preferably includes at least one user device 20 and a cloud computing server system 50. The cloud computing server system 50 may be a cluster of cloud-based computing servers and provides cloud-based centralized computing power, in contrast to the edge or distributed computing power executed on the separated individual nodes, such as the user device 20.

The user device 20 has the internet capability, is preferably a web-enabled user equipment or an internet capable device that is equipped with appropriate internet connectivity, such as Wi-Fi, Bluetooth, 4G, 5G, 6G, or Sub-1G, and installed with a web browser 30 to enable web browsing to access internet. The example user device 20 preferably is, such as mobile internet device (MID), portable internet device, desktop computer, notebook computer, tablet device, game console, smart glass, or mobile phone device.

A computer-assisted cloud based robotic construction software platform 40 (hereinafter referred to as the platform for short), also known as a robot simulator, is established based on the software as a service (SAAS) technology and the platform as a service (PAAS) technology and a backend cross-platform software. The platform 40 is originally installed and functions on the cloud computing server system 50, addressed on the internet by specifying a uniform resource locator (URL), and thus available to users or subscribers over the internet. Any user is able to access, use, and operate the platform 40 easily by connecting to the internet by one's own user device 20, opening the web browser 30 on the user device 20 and entering the URL directing into the web browser 30.

The platform 40 is configured to generate various visualization interfaces 31 acting as frontend user interfaces in the web browser 30 running on the user device 20. The platform 40 is configured to receive user operations corresponding to interactions with visualization interfaces 31 shown in the web browser 30 from one's own user device 20 as instructions to execute correspondingly and accordingly.

In response to the received user operations, the platform 40 is capable of executing a variety of built-in modules that enable various assistances in all aspects of coordinating, sequencing, scheduling, planning, and simulating robotic motions or paths of one or more robots, for any users to coordinate, sequence, schedule, plan, design, simulate, re-sequence, re-schedule, re-plan, re-design robotic motions or paths for one robot or among more robots. The platform 40 is configured to conclude the determined robotic motions as a predetermined motion command set or a robot script set and output and transmit the set to the respective controllers of the corresponding actual robots 60. The platform 40 further includes a couple of externally-operated modules in a form of add-ins module cooperated with and functions within the building information modelling (BIM) software tools 70, such as AUTODESK REVIT, SketchUp, GRAPHISOFT ARCHICAD, etc., for any users to operate.

Preferably, the robot or robots are industrial-use multi-axis robots and used in construction process, such as semi-automated construction, automated construction, or near-site construction, to perform a physical fabrication task, in particular, a construction component prefabrication task. The construction process may involve the use of one or more robots that may be used to construct a variety of components of a building. The robots may be equipped with end-effector-mounted tools, such as a gripper or a drill, that may be used during construction process. The actual robots are configured and controlled to act according to the predetermined motion command set including sequences or paths of specific motions sent from the respective controllers to complete the specified task.

The platform 40 is preferably a no-code robotic motion simulation software, and the generated visualization interfaces in the web browser 30 may provide multiple visualization-based functions and various easy-to-use robotic programming tools. The platform 40 provides a simulation to real (sim-to-real) virtual physical environment with built-in physics engine that enables virtual robot objects to simulate or approximate universal forces existing in the real world, such as gravity, velocity, acceleration, friction, etc., for any users with different level of computer skills distributed from ordinary people, such as subscribers or contractors, to professionals, such as programmers, designers or engineers, to simulate robotic motions or paths without writing or typing a single line of code.

The platform is configured to generate a visual programming panel embedded in the visualization interface for any user to program and configure robotic motions performing in the robot simulator graphically and visually. The visual programming panel graphically shows a variety of blocks with different lengths that are sequenced and arranged upon a timeline editor. Each of the variety of blocks represent different predefined robotic motions respectively. By utilizing the visual programming panel, any users are allowed to program and configure robotic motions simply by dragging and dropping the blocks into the timeline editor. The blocks are also referred to as and replaceable by graphical or iconic elements or boxes.

In this embodiment, visualization interfaces are embedded with a variety of quick menus, dropdown menus, buttons and toggles with highly customizable configurations for the specific purpose of easy-to-use. Any user from ordinary people, such as subscribers or contractors, to professionals, can perform the planning and simulations for robotic construction process without typing a single line of code and actually actuating the robots. In particular, the visualization interfaces are especially enhanced and improved in the aspect of visualizing the timeline-related arrangement and scheduling processes for robotic motions of a single robot, or among multiple robots.

Figure 2:
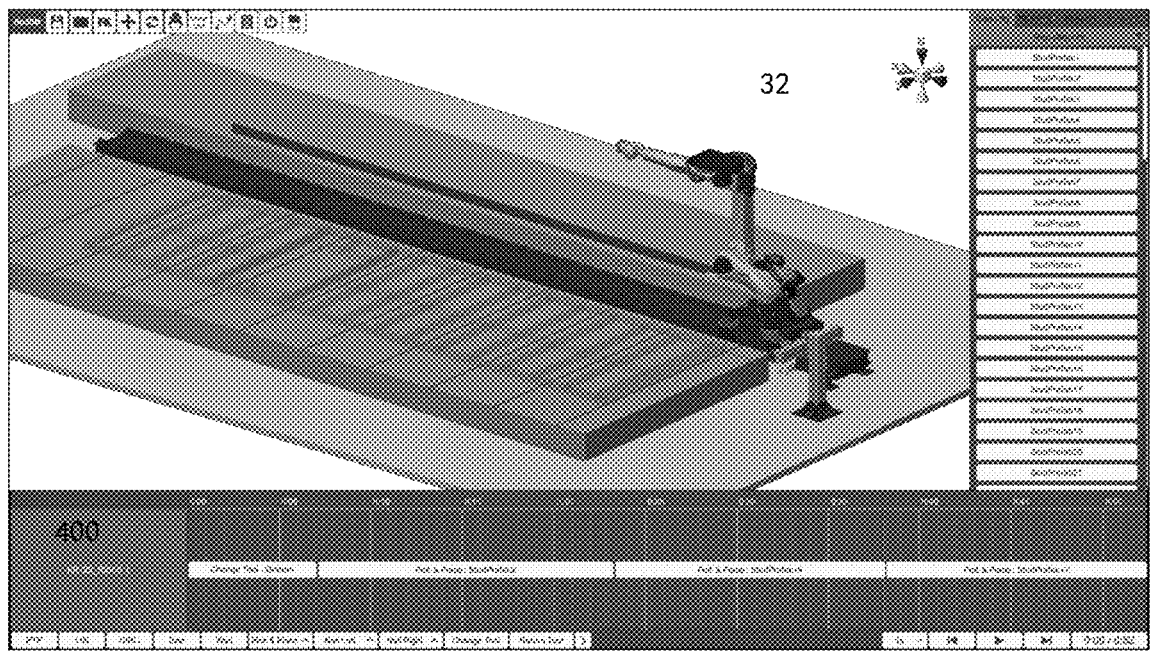
FIG. 2 is a schematic diagram illustrating a standard layout of the visualization interface generated by the platform in accordance with the present invention.

FIG. 2 is a schematic diagram illustrating a standard layout of the visualization interface generated by the platform in accordance with the present invention. The platform 40 is configured to generate a series of visualization interfaces 31 to be provided through the web browser 30 for any user to access and operate the platform 40. Four edges, including the left-hand and right-hand sides and the upper and lower parts, of the respective visualization interfaces 31 are preferably arranged and configured to embed with a variety of functional sidebars, toolbars, operating panels, or functional panels. The most and central part within the respective visualization interfaces 31 is configured to provide a main display window 32 virtually showing an animated simulation for the robots and the work cell. In some embodiments, the visual programming panel 400 is preferably a horizontal toolbar and to be positioned for example at the lower part of visualization interface 31.

Figure 3:
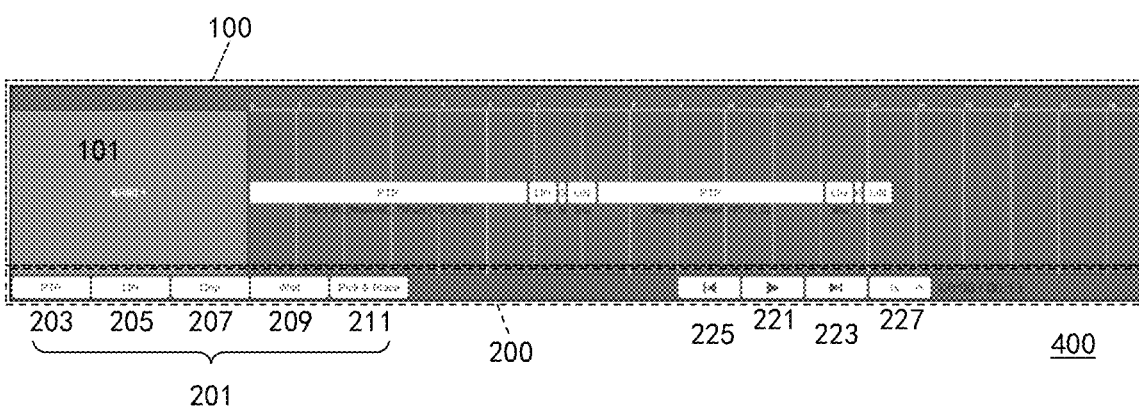
FIG. 3 is a schematic diagram illustrating an example visual programming panel embedded in the visualization interface according to the present invention.

FIG. 3 is a schematic diagram illustrating an example visual programming panel embedded in the visualization interface according to the present invention. The visual programming panel 400 preferably consists of at least one timeline editor 100 and a bottom bar 200. The at least one timeline editor 100 is identified by a robot ID filled and designated in the robot ID field 101, which is opened for a user to input, and is assigned to program and configure motions for a target robot corresponding to robot ID.

The timeline editor 100 provides a timeline workspace over a horizontal timeline view in the background. The timeline view may contain multiple timescales that are spaced with each other in an equal or variable distance used to indicate a defaulted time interval, for example, 1 second, in this embodiment. The bottom bar 200 provides a plurality of different blocks 201, and a plurality of control buttons including a play button 221, a forward button 223, a backward button 225, and a play speed button 227, for any users to use.

Each of different blocks 201 are labeled with such as a combination of lettered notations and symbols, represent for a specific motion, and refer to a macro that consists of a series of declarations, statements, codes and structured programming that are automatically generated by the system and enable the end effector or the robot to complete a specific motion consisting of multiple basic actions subject to given conditions and parameters. In some embodiments, blocks can be nested within other blocks. Several example blocks 201 are provided in this disclosure.

For instance, the PTP block 203 is the block 201 labeled with PTP and consists of a macro that is automatically generated by the system and enables the end effector of the robot to complete a movement to move from one point to another point subject to all the given conditions and parameters. The Grip block 207 is the block 201 labeled with Grip and consists of a macro that enables the end effector to complete a grip motion to grip a selected member/object with an adequate pressure subject to the given conditions and parameters.

The LIN block 205 is the block 201 labeled with LIN and consists of a macro that enables the end effector to complete a linear movement from one point to another point in a linear trajectory subject to the given conditions and parameters. The Wait block 209 is the block 201 labeled with Wait and consists of a macro that enables the end effector to suspend or stay still in the current position. The Pick & Place block 211 is the block 201 labeled with Pick & Place and consists of a macro that enables the end effector to lift up and transport the griped member, and place it on a selected place. The Nail block is the block 201 labeled with Nail and consists of a macro that enables the end effector to perform a nailing motion.

The specific motion, which the block represents for, is user-definable, customizable and expandable. The present system allows a user to define and configure a new block represents for a user-defined new specific motion by programming a corresponding API. A user may create a new block to complete a specific motion on one's own interest. The length of each of the blocks 201 represents for the runtime of the specific motion, and is adjustable.

The visual programming panel 400 allows a user to code programs and set up configurations required to drive the end effector or the robot in the robot simulator by simply dragging and dropping the blocks into the timeline editor 100, in a fun fashion like the building of a puzzle, instead of writing complex computer codes. The spatial arrangements of blocks on the timeline workspace in the timeline editor 100 is the sequence of specific motions performed in the robot simulator.

In some embodiments, while the scene, and the conditions and parameters are given and set up, and the target robot is designated in the robot ID field 101, a particular block 201 representing for a specific motion, for example, a PTP block 203 representing a point-to-point motion, is selected and dragged into the timeline editor 100. The length of the PTP block 203 is duly adjusted and represents for the runtime or the schedule of the point-to-point motion that is inversely related to the speed of motion. The fixed-interval timescales distributed over the timeline view is capable of assisting in the estimation of the runtime for completing the point-to-point motion.

More and more blocks are allowed to add into the timeline workspace in the timeline editor 100 with a particular sequence to form a chain of motions for the target robot to perform in the robot simulator. In some embodiments, multiple block including the LIN block 205, the Grip block 207, the LIN block 205, the PTP block 203, the LIN block 205, the Grip block 207, and the LIN block 205, are sequentially added into the timeline workspace, as shown in FIG. 3.

In FIG. 3, the horizontal spatial arrangements of the above all blocks in the timeline editor 100 refers to the chain of motions consisting of the point-to-point motion, the linear motion, the grip motion, the linear motion, the point-to-point motion, the linear motion, the grip motion, and the linear motion performed in sequence by the target robot in the robot simulator. The timeline editor 100 demonstrates how a set of robotic motions is sequenced and scheduled over time.

Whenever the arrangements of the blocks are done temporarily or periodically, the play button 221 is clicked to commence the animated simulation of the programmed chain of motions in the main display window in the visualization interface in FIG. 2. The present visual programming panel 400 is helpful to reduce the barrier of entry for novice player or user as they begin learning robotic construction. At the same time, FIG. 2 is also used to illustrate an animated simulation of robotic motions for a single-robot implementation demonstrated in the main display window 32 in the visualization interface 31 according to the configurations defined on the visual programming panel 400 including a single timeline editor in accordance with the present invention.

When the animated simulation shows an acceptable result for the robotic motions, the robot simulator is enabled to conclude the result by transforming the programmed robotic motions defined and configured on the visual programming panel into a motion command set, and stream out the motion command set to the designated actual robot to move accordingly, so as to perform tasks in, for example, an off-site robotic construction.

Figure 4:
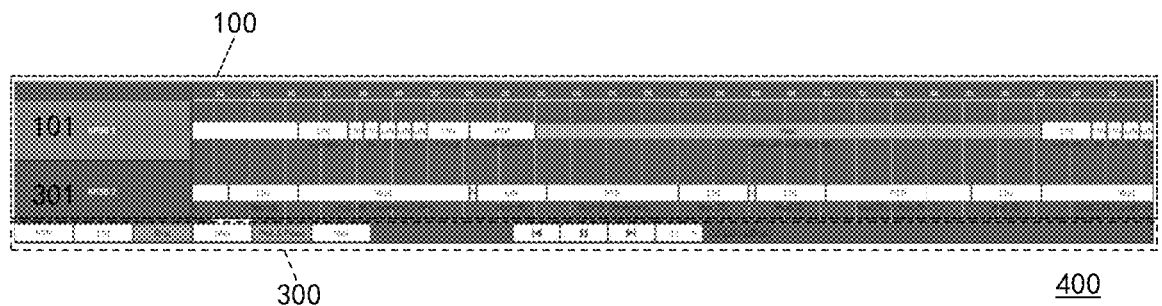
FIG. 4 is a schematic diagram illustrating an example visual programming panel including dual timeline editors and embedded in the visualization interface according to the present invention.

FIG. 4 is a schematic diagram illustrating an example visual programming panel including dual timeline editors and embedded in the visualization interface according to the present invention. When there are multiple robots required to program and coordinate the robotic motions thereamong, a second timeline editor 300 or more timeline editors are further plugged into the visual programming panel 400 as per user's request. As shown in FIG. 4, which demonstrates a scenario of dual-robot implementation, the first timeline editor 100 is assigned to program motions for a target robot with the robot ID of KR90 1 that is designated in the robot ID field 101 by user, and the second timeline editor 300 is assigned to program motions for a target robot with the robot ID of KR90 2 that is designated in the robot ID field 301 by user.

In some embodiments, whenever the scene, and the conditions and parameters are given and set up, and the arrangements of the blocks for the target robot KR90 1 and the target robot KR90 2 are done temporarily or periodically, the play button 221 is clicked to commence the animated simulation of the programmed chain of motions for a scenario of dual robots in the main display window in the visualization interface in FIG. 11.

Figure 5:
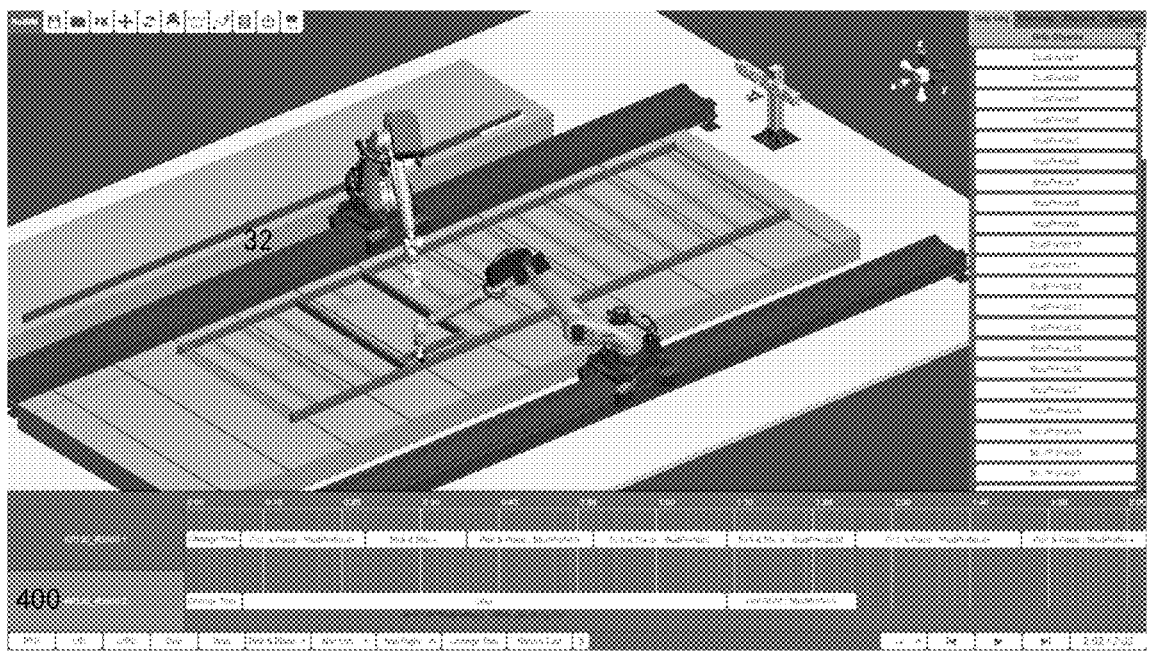
FIG. 5 is a schematic diagram illustrating an animated simulation of robotic motions for dual-robot implementation demonstrated in the main display window in the visualization interface according to the configurations defined on the visual programming panel including dual timeline editors in accordance with the present invention.

FIG. 5 is a schematic diagram illustrating an animated simulation of robotic motions for dual-robot implementation demonstrated in the main display window in the visualization interface according to the configurations defined on the visual programming panel including dual timeline editors in accordance with the present invention. As shown in FIG. 5, an animated simulation of robotic motions for dual-robot implementation demonstrated in the main display window 32 in the visualization interface 31 according to the configurations defined on the visual programming panel 400 including dual timeline editors.

Preferably, the robot simulator may automatically call and execute an intelligent multi-robot motion coordination algorithm component, to autonomously coordinate and generate sequences of motions for multiple robots working together within a single timeframe in the animated simulation. When the animated simulation shows an acceptable result for the multiple robot motions, the robot simulator is enabled to conclude the result by transforming the programmed robotic motions defined and configured on the visual programming panel into a motion command set, and stream out the motion command set to the designated actual robots to move accordingly, so as to perform tasks in, for example, an off-site robotic construction.

Figure 6:
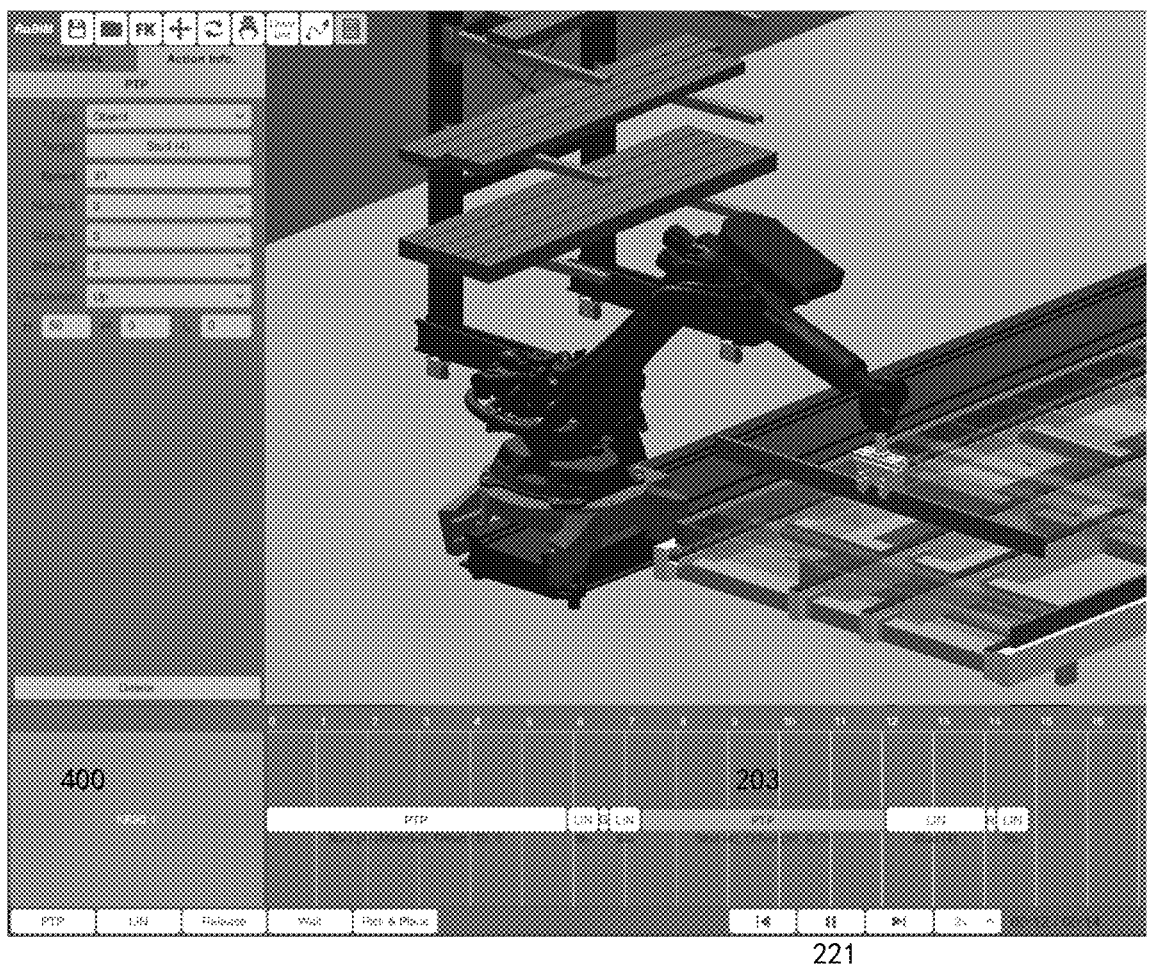
FIG. 6 is a schematic diagram illustrating a collision warning on the PTP block during the performance of the point-to-point motion according to the present invention.

FIG. 6 is a schematic diagram illustrating a collision warning on the PTP block during the performance of the point-to-point motion according to the present invention. Preferably, whenever the play button 221 is clicked, the robot simulator may automatically call and execute an intelligent collision auto-avoidance algorithm component, to perform a collision-check process, to detect any possible collision with object or material to find out a collision-free path for the end effector or the robot to follow. If there is any collision occurs in a specific motion, the corresponding block is flagged with flashing red color.

As shown in FIG. 6, once a possible collided motion is detected for the performance of the point-to-point motion by the intelligent collision auto-avoidance algorithm component, a flashing red color is marked at the corresponding PTP block 203 on the visual programming panel 400, to warn the user. The user may select to reset or adjust the work cell or the given conditions and parameters in the robot simulator to remove the possible collision. In alternative, the user may select to re-click the PTP block 203 again. The intelligent collision auto-avoidance algorithm component is to automatically compute a collision-free path, in response to the user's operation.

Figure 7:
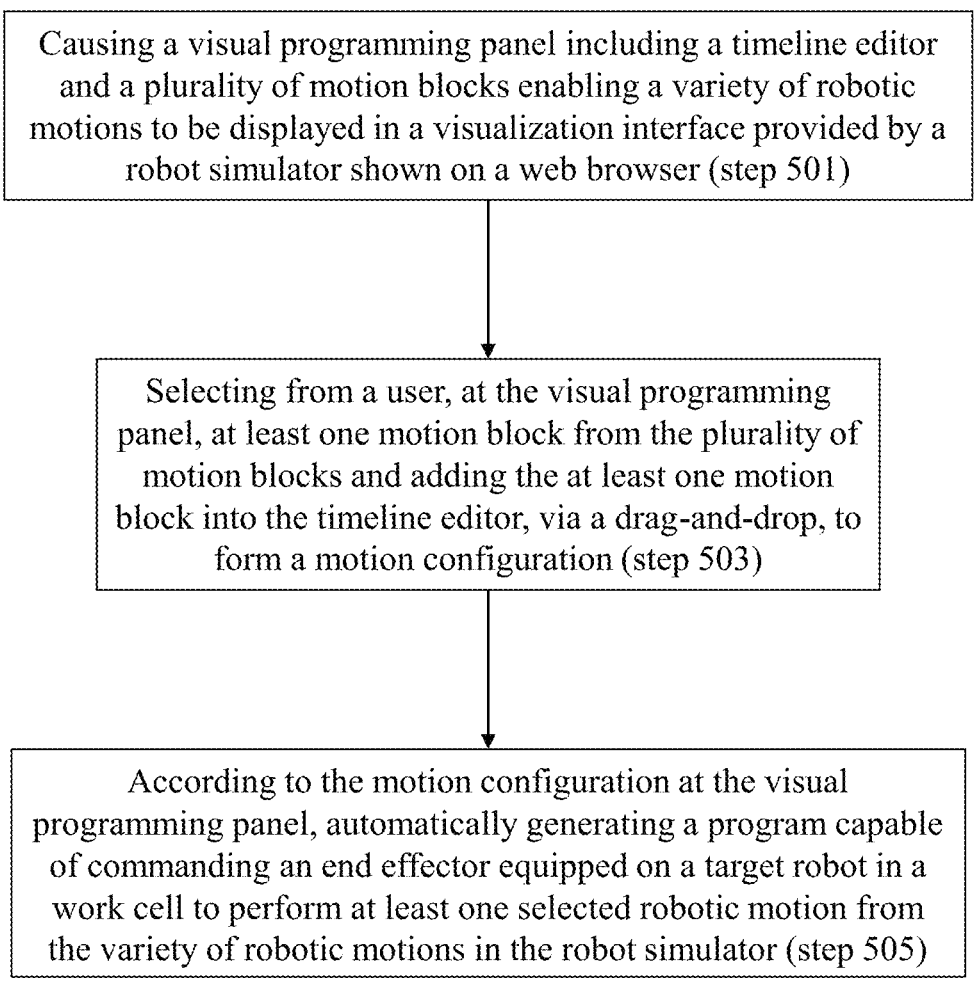
FIG. 7 is a flow chart illustrating the cloud based computer-implemented for visually programming robotic motions in construction according to the present invention.

FIG. 7 is a flow chart illustrating the cloud based computer-implemented for visually programming robotic motions in construction according to the present invention. To sum up, the cloud based computer-implemented method 500 for visually programming robotic motions in construction in accordance with the present invention preferably includes the following steps: causing a visual programming panel including a timeline editor and a plurality of motion blocks enabling a variety of robotic motions to be displayed in a visualization interface provided by a robot simulator shown on a web browser (step 501); selecting from a user, at the visual programming panel, at least one motion block from the plurality of motion blocks and adding the at least one motion block into the timeline editor, via a drag-and-drop, to form a motion configuration (step 503); and according to the motion configuration at the visual programming panel, automatically generating a program capable of commanding an end effector equipped on a target robot in a work cell to perform at least one selected robotic motion from the variety of robotic motions in the robot simulator (step 505).

The contents in section of written descriptions of the invention disclosed in U.S. Provisional Application No. 63/007,060, filed on Apr. 8, 2020, now pending, is fully incorporated by reference as follows.

The present invention relates to a timeline based manually-operated visual panel module used for coordinating and scheduling motions of multiple virtual robots which the visual panel is preferably embedded in a browsable robot simulator platform which provides an animation-based programming interface which allows the user to program the robot motions without learning and typing lines of code.

The visual panel is configured at the top or the bottom in the animation-based programming interface and presented as a programming panel, and consists of a robot identification window and timeline window in principal. The robot identification window is used for showing a name, a symbol or a code for robots, and the timeline window includes multiple large-scale time division slots further including multiple small-scale time division slots. No matter the multiple large-scale time division slots or the multiple small-scale time division slots, each of slots are equally spaced and distributed in the timeline window.

There is a block set consisting of multiple default action blocks, a.k.a.: objects or blocks, such as but not limited to, a PTP block, a LIN block, a Grip block, a Wait block, a Pick & Place block, and etc., shown at the lowest bottom of the panel. Each action blocks typically represent a programming instruction that enables the robot to act a specified action. For example, the Pick & Place block is simply a programming instruction enabling the robot to pick up some thing and place it to a specific spot. Users are allowed to newly establish and define one's own action block that is currently not included in the block set, and put it into the block set.

A user manually selects an action block out of multiple action blocks from the block set, and attach it to the timeline window. The selected action block is horizontally enlargeable or expandable, such that the user is allowed to freely adjust the width of the action block to render its left edge aligned with a starting time of the action and its right edge aligned with an ending time of the action respectively. The user can put more action blocks into the timeline window to schedule and arrange a chain of motion consisting of a series of actions the virtual robot performs. When multiple blocks are continuously place and shown in the timeline window, a motion bar representing the chain of motion is thus formed, and instructing the robot to act accordingly.

Users are allowed to add more virtual robots into the robot identification window and attach multiple action blocks into the timeline window for the added virtual robot. When there are multiple virtual robots are put into and presented in the visual panel, one not skilled in programming still can synchronize, arrange, schedule, coordinate and timely aligned the actions and the sequence of actions among robots easily and simply, just by adjusting the sequences, arrangements and sizes of the multiple blocks manually and intuitively.

Further to the above, the method and module includes features as follows: reducing the learning threshold of robot programming, for which most engineers can learn and control the basic robot operations within one hour.

Further to the above, the method and module includes features as follows: linking building information model to robot controls, off-site manufacturing, on-site facilitation, and building beyond the human workers, etc. A design tool set that ties the BIM design to the robotic prefabrication.

There are further embodiments provided as follows.

Embodiment 1: A computer-implemented method includes: causing a visual programming panel including a timeline editor and a plurality of motion blocks enabling a variety of robotic motions to be displayed in a visualization interface provided by a robot simulator shown on a web browser; selecting from a user, at the visual programming panel, at least one motion block from the plurality of motion blocks and adding the at least one motion block into the timeline editor, via a drag-and-drop, to form a motion configuration; and according to the motion configuration at the visual programming panel, automatically generating a program capable of commanding an end effector equipped on a target robot in a work cell to perform at least one selected robotic motion from the variety of robotic motions in the robot simulator.

Embodiment 2: The computer-implemented method as described in Embodiment 1 further includes one of following steps: causing a visual programming panel including the timeline editor and the plurality of motion blocks to be displayed in the visualization interface provided by the robot simulator shown in the web browser, wherein each of the plurality of motion blocks are associated to enable the end effector equipped on the target robot to perform the variety of robotic motions respectively subject to current conditions given in the robot simulator; selecting from the user, at the visual programming panel, a plurality of selected motion blocks from the plurality of motion blocks and adding the plurality of selected motion blocks into the timeline editor, via the drag-and-drop, to form a first motion configuration; and according to the first motion configuration at the visual programming panel, automatically generating a first program capable of commanding the end effector equipped on the target robot to perform a plurality of selected robotic motions from the variety of robotic motions in the robot simulator.

Embodiment 3: The computer-implemented method as described in Embodiment 1, the timeline editor is identified by a robot ID in a robot ID field and assigned to generate a program capable of commanding an end effector to perform according to the motion configuration at the visual programming panel and provides a timeline workspace over a horizontal timeline view in the background, which the horizontal timeline view contains multiple timescales that are spaced with each other in an equal or variable distance to indicate a defaulted time interval.

Embodiment 4: The computer-implemented method as described in Embodiment 3, the spatial arrangements of the plurality of selected motion blocks on the timeline workspace in the timeline editor is the sequence of the plurality of selected robotic motions performed in the simulator.

Embodiment 5: The computer-implemented method as described in Embodiment 3, the each of the plurality of selected motion blocks have a length that represents for respective runtimes of the plurality of selected robotic motions, and are adjustable on the timeline workspace.

Embodiment 6: The computer-implemented method as described in Embodiment 1, the variety of robotic motions are selected from a point-to-pint based robotic motion, a linear trajectory based robotic motion, a grip based robotic motion, a pick and place based robotic motion, a nailing based robotic motion, and a wait based robotic motion.

Embodiment 7: The computer-implemented method as described in Embodiment 1, the visual programming panel further includes a bottom bar to provide the plurality of motion blocks for a user to select, and a play button, a forward button, a backward button, and a play speed button, for a user to operate.

Embodiment 8: The computer-implemented method as described in Embodiment 7 further includes one of following steps: pressing the play button to commence an animated simulation demonstrating the process how the end effector and the target robot perform in the work cell according to the motion configuration at the visual programming panel; and transforming the motion configuration at the visual programming panel into a motion command set that is capable of driving an actual robot corresponding to the target robot in the simulator to move accordingly and outputting the motion command set to the actual robot.

Embodiment 9: A computer-implemented system includes: a user device installed with a web browser to enable web browsing to access an internet for a user to operate; and a cloud computing server system available on the internet and configured to: cause a visual programming panel including a timeline editor and a plurality of motion blocks enabling a variety of robotic motions to be displayed in a visualization interface provided by a robot simulator shown on the web browser; receive by the user device from the user, at the visual programming panel, a selection of at least one motion block from the plurality of motion blocks and add the selected at least one motion block into the timeline editor, via a drag-and-drop, to form a motion configuration; and according to the motion configuration at the visual programming panel, automatically generate a program capable of commanding an end effector equipped on a target robot in a work cell to perform at least one selected robotic motion from the variety of robotic motions in the robot simulator shown on the web browser.

Embodiment 10: The computer-implemented system as described in Embodiment 9 further includes one of following elements: a computer-assisted cloud based robotic construction platform installed on the cloud computing server system and configured to provide the visualization interface for a user to operate through the web browser, wherein the computer-assisted cloud based robotic construction platform is established based on the software as a service (SAAS) technology and the platform as a service (PAAS) technology; and the user device providing and running the web browser for the user to operate to access the computer-assisted cloud based robotic construction platform on the cloud computing server system remotely through the visualization interface to create the motion configuration.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A computer-implemented method, comprising:
    providing a computer-assisted cloud based robotic construction software platform which integrates and comprises an externally-operated building information model (BIM) module for linking BIM data to robot controls, and a robot simulator, for a user to select and operate, to provide a comprehensive online cloud computation based computer-assisted virtual planning, simulation, and demonstration for a virtual robotic device corresponding to a robotic device in reality, wherein the robotic device in reality performing robot motions is dedicated to prefabricate a plurality of construction components in an off-site robotic semi-automated building construction work in the field of civil engineering in accordance with a BIM data imported from the externally-operated BIM module and corresponding to actual building construction information conditions in reality in the off-site robotic semi-automated building construction work;
    causing a visual programming panel comprising a dual robot timeline editor for a visual programming and integrating and comprising a first timeline editor and a second timeline editor that are associated to a first target robot and a second target robot, respectively, a play button, and a plurality of motion blocks enabling a variety of robotic motions to be displayed in a visualization interface provided by the robot simulator shown on a web browser;
    selecting from the user, at the visual programming panel, at least two motion blocks from the plurality of motion blocks and adding the at least two motion blocks into the first timeline editor and the second timeline editor, respectively, according to a first temporal sequence of performance and a second temporal sequence of performance that the first target robot and the second target robot are scheduled to perform the at least two motion blocks in time, via a drag-and-drop, to form a first motion configuration and a second motion configuration, respectively, wherein an order of a first spatial arrangement of the at least two motion blocks in the first timeline editor and a second spatial arrangement of the at least two motion blocks in the second timeline editor are the first temporal sequence of performance and the second temporal sequence of performance, respectively;

at the dual robot timeline editor, providing for the user to manually perform a trial-and-error test to find out a first collision-free path and a second collision-free path between the first target robot and the second target robot, respectively, including manually activating an execution of a collision check for the first and second motion configurations by clicking the play button on the dual robot timeline editor to detect whether or not the first and second motion configurations are configured to form the first and second collision-free paths for the first and second target robots to follow based on the first and second spatial arrangements in the first and second timeline editors, respectively, highlighting a specific motion causing a collision if the first or second motion configurations fail to pass the collision check in the first or second timeline editors, and manually rearranging or adjusting the first or second spatial arrangements, respectively, if the first or second motion configurations fail to pass the collision check in the first or second timeline editors, until the first and second motion configurations all pass the collision check;

simultaneously visually simulating that the first target robot and the second target robot perform the first motion configuration and the second motion configuration represented by the at least two motion blocks according to the first temporal sequence of performance defined in the first timeline editor and the second temporal sequence of performance defined in the second timeline editor in the visualization interface provided by the robot simulator shown on the web browser by an animated simulation; and according to the first motion configuration and the second motion configuration at the visual programming panel, automatically generating a program configured to command a first end effector equipped on the first target robot and a second end effector equipped on the second target robot in a work cell to respectively perform the at least two selected robotic motions in the robot simulator.

2. The computer-implemented method as claimed in claim 1, further comprising one of following steps:

causing the visual programming panel comprising the dual robot timeline editor and the plurality of motion blocks to be displayed in the visualization interface provided by the robot simulator shown in the web browser, wherein each of the plurality of motion blocks are associated to enable the end effector equipped on the target robot to perform the variety of robotic motions respectively subject to current conditions given in the robot simulator;

selecting from the user, at the visual programming panel, a plurality of first motion blocks out of from the plurality of motion blocks and adding the plurality of first motion blocks into the dual robot timeline editor, via the drag-and-drop, to form the first motion configuration;

according to the first motion configuration at the visual programming panel, automatically generating a first program configured to command the first end effector equipped on the first target robot to perform a plurality of first robotic motions from the variety of robotic motions in the robot simulator according to the plurality of first motion blocks; and according to the second motion configuration at the visual programming panel, automatically generating a second program configured to command the second end effector equipped on the second target robot to perform the plurality of robotic motions from the variety of robotic motions in the robot simulator.

3. The computer-implemented method as claimed in claim 2, wherein the first timeline editor and the second timeline editor are identified by a first robot ID and a second robot ID, respectively, in a robot ID field and are assigned to generate the first program configured to command the first end effector to perform according to the first motion configuration at the visual programming panel and to generate the second program configured to command the second end effector to perform according to the second motion configuration at the visual programming panel, respectively, and provides a timeline workspace over a horizontal timeline view in the background, which the horizontal timeline view contains multiple timescales that are spaced with each other in an equal or variable distance to indicate a defaulted time interval.

4. The computer-implemented method as claimed in claim 3, wherein the each of the plurality of first motion blocks have a length that represents for respective runtimes of the plurality of first robotic motions, and are adjustable on the timeline workspace.

5. The computer-implemented method as claimed in claim 1, wherein the variety of robotic motions are selected from a point-to-pint based robotic motion, a linear trajectory based robotic motion, a grip based robotic motion, a pick and place based robotic motion, a nailing based robotic motion, and a wait based robotic motion.

6. The computer-implemented method as claimed in claim 1, wherein the visual programming panel further comprises a bottom bar to provide the plurality of motion blocks for the user to select, and the play button, a forward button, a backward button, and a play speed button, for the user to operate.

7. The computer-implemented method as claimed in claim 6, further comprising one of following steps:

pressing the play button to commence the animated simulation demonstrating the process how the first end effector, the second end effector, the first target robot and the second target robot perform in the work cell according to the first motion configuration and the second motion configuration at the visual programming panel; and transforming the first motion configuration and the second motion configuration at the visual programming panel into a motion command set that is configured to drive a first actual robot corresponding to the first target robot in the simulator to move accordingly and outputting the motion command set to the first actual robot and configured to drive a second actual robot corresponding to the second target robot in the simulator to move accordingly and outputting the motion command set to the second actual robot.

* * * * *